(12) United States Patent
Curiel Franco

(10) Patent No.: US 10,497,254 B2
(45) Date of Patent: Dec. 3, 2019

(54) METHOD AND SYSTEM FOR CONTROLLING ACCESS IN DEVICES THAT ARE OPENED AUTOMATICALLY USING A UNIVERSAL REMOTE CONTROL

(71) Applicant: Jose Carlos Curiel Franco, Madrid (ES)

(72) Inventor: Jose Carlos Curiel Franco, Madrid (ES)

( * ) Notice: Subject to any disclaimer, the term of this patent is extended or adjusted under 35 U.S.C. 154(b) by 0 days.

(21) Appl. No.: 15/543,904

(22) PCT Filed: Jan. 14, 2016

(86) PCT No.: PCT/ES2016/070014
§ 371 (c)(1),
(2) Date: Jul. 14, 2017

(87) PCT Pub. No.: WO2016/113453
PCT Pub. Date: Jul. 21, 2016

(65) Prior Publication Data
US 2018/0012483 A1 Jan. 11, 2018

(30) Foreign Application Priority Data
Jan. 15, 2015 (ES) .................. 201530036

(51) Int. Cl.
*G08C 17/02* (2006.01)
*G07C 9/00* (2006.01)
*H04M 11/00* (2006.01)

(52) U.S. Cl.
CPC ............... *G08C 17/02* (2013.01); *G07C 9/00* (2013.01); *G07C 9/00007* (2013.01);
(Continued)

(58) Field of Classification Search
CPC ............ G07C 9/00007; G08C 17/02; G08C 2201/92; G08C 2201/93
(Continued)

(56) References Cited

U.S. PATENT DOCUMENTS

| 9,721,413 | B2* | 8/2017 | Dumas | ............... G07C 9/00309 |
| 9,767,630 | B1* | 9/2017 | Kazerani | ............. G07C 9/00111 |

(Continued)

FOREIGN PATENT DOCUMENTS

GB    2 417 591 A    3/2006

OTHER PUBLICATIONS

Non-English International Search Report dated Mar. 30, 2016 for Application No. PCT/ES2016/070014 with English translation.

*Primary Examiner* — Ojiako K Nwugo
(74) *Attorney, Agent, or Firm* — Ladas & Parry LLP

(57) ABSTRACT

The invention relates to a method and system for controlling access from a communications network (2) to any device (4) that is opened automatically, said system comprising a mobile device (2) and a remote control (1). The remote control (1) is characterized in that it: obtains the signals that control the automatic opening devices (4), either by means of cloning via antenna or using other means, and transmits said signals to the communications network (3), by means of its connection to any mobile device (2). Access can then be controlled from the communications network (3), simply by transmitting the signal that actuates the automatic opening device (4), via the mobile device (2) to which the remote control (1) is connected, to another requesting remote control (1). The remote control (1) then transmits the signal allowing the actuation thereof. Any remote control (1) can be used to actuate any automatic opening device (4).

10 Claims, 1 Drawing Sheet

(52) U.S. Cl.
CPC ......... *G07C 9/00309* (2013.01); *H04M 11/00* (2013.01); *G07C 2009/00928* (2013.01); *G08C 2201/42* (2013.01); *G08C 2201/92* (2013.01); *G08C 2201/93* (2013.01)

(58) Field of Classification Search
USPC .............................................. 340/5.7, 539.11
See application file for complete search history.

(56) References Cited

U.S. PATENT DOCUMENTS

| | | |
|---|---|---|
| 2002/0137460 A1 | 9/2002 | Sun et al. |
| 2008/0014869 A1* | 1/2008 | Demirbasa .............. H04M 1/67 455/41.2 |
| 2017/0154485 A1* | 6/2017 | Dumas ............... G07C 9/00309 |
| 2017/0232931 A1* | 8/2017 | Fernando ................ B60R 25/24 701/2 |

* cited by examiner

[Fig. 1]
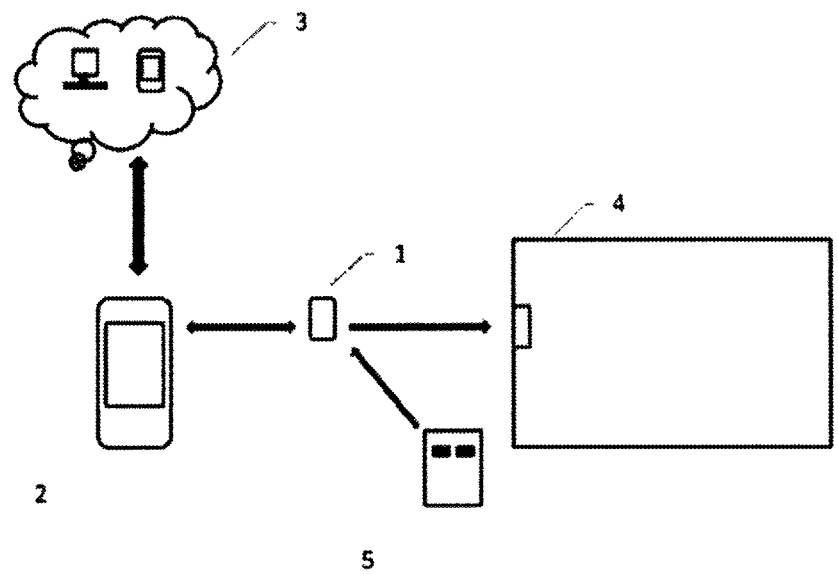
[Fig. 2]
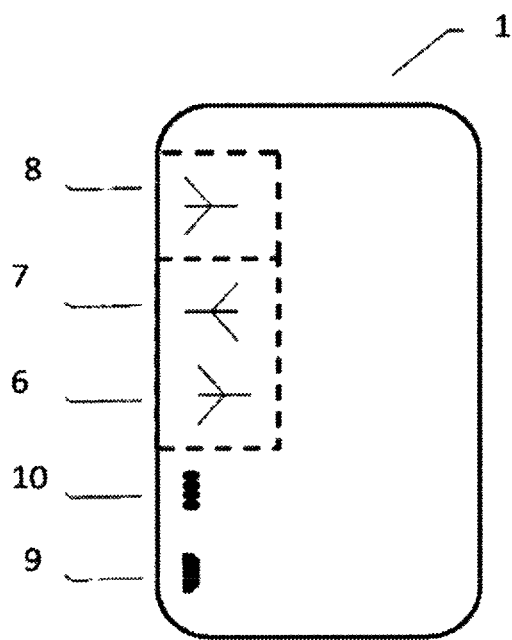

METHOD AND SYSTEM FOR CONTROLLING ACCESS IN DEVICES THAT ARE OPENED AUTOMATICALLY USING A UNIVERSAL REMOTE CONTROL

RELATED APPLICATION

This application is application under 35 U.S.C. 371 of International Application No. PCT/ES2016/070014 filed on Jan. 14, 2016, the entire contents of which are incorporated herein by reference.

TECHNOLOGICAL SECTOR

This invention belongs to the access control and management systems sector, and more specifically, to those systems equipped with automatic opening devices operated with a remote control.

BACKGROUND

In the state of the art, remote controls are known for opening doors both in accesses to areas, such as garages, or in accesses to vehicle interiors. The communication between the said remote control and its receiver occurs by means of a radio-frequency signal. When a button is pressed, the remote control sends a signal, and a receiver located on the door, proceeds to open it. One disadvantage of such a remote control is the limited number of doors that users can open. In general, remote controls store an opening code for a single door, and at the most, a limited number of codes for a limited number of doors. Another disadvantage of the traditional remote control is that it does not make it possible to control and manage accesses remotely: i.e., we cannot interact on doors from long distance, or obtain information on their status.

Recently, systems have come onto the market that make it possible to access garages, using mobile phones as remote controls, and dispensing with the traditional remote control. The disadvantages lie in that together with the access door, an extra control module needs to be installed that controls its opening and which interacts with the mobile phone. But in addition to this there is also another additional disadvantage, that the control modules need to be connected to the internet, either by cable or in a wireless manner via a router, which is not viable in some locations. Furthermore, these are not systems that are compatible with previously existing devices, which turns out to be another disadvantage. If we want to remotely control and manage a significant number of doors, we have to install a module on each door, which turns out to be a disadvantage, and to install the corresponding internet connection, which is another major disadvantage, where doing so is even viable.

EXPLANATION

The subject of this invention is a system that solves the disadvantages described in the state of the art. It would therefore be desirable to have an automatic opening system that does not require installing a control module that is added to the automatic opening device. It would also be desirable for the new system to be compatible with as many automatic opening devices as possible, not only in future installations, but also in already existing ones currently operating, thus with a universal nature. It would be desirable for the new system to allow for remote interaction on as many automatic opening systems as possible, making it possible to exercise control and management in the accesses on any automatic opening device, for example, from a communications network.

In this invention, a mobile device refers to: a mobile phone or similar, a smart watch, a portable computer, or any other electronic device with the ability to communicate via a telecommunications network, from which interaction is possible. A telecommunications network, such as the internet, refers to a network where mobile devices, computers or other devices are connected that interact with the network. An automatic opening device refers to an access system traditionally comprising, and without being limited to or entering into details: a door and a control module that makes it possible to move it, either by merely unlocking it or mechanically by engaging a motor. An automatic opening device usually consists of a remote control that sends out signals for remote opening. In this invention, a signal refers to the signal that is issued by the remote control of an automatic opening device, and which makes engagement possible; they are usually radio-frequency signals. Referring to a signal is to refer to the code the signal contains or to the data that makes it possible for it to be reproduced.

This invention solves the technical problems of dispensing with the installation of a control module together with the automatic opening device, of being compatible with as many automatic opening devices as possible, whether existing or in the future, and of being able to control and manage accesses on any automatic opening device remotely, such as from a communications network.

To this end, this invention refers to a system for controlling any automatic opening system, that also comprises a mobile device and a remote control, which is the main subject of this invention.

The remote control is characterised in that it allows for the automatic opening device to be controlled wirelessly as will be explained below, and also because it makes it possible to connect with the mobile device, via a wireless connection, and thanks to the mobile devices' ability to connect to short- and medium-range peripherals. The mobile device, in turn, makes it possible to connect via a communications network, which is why a connection exists between the communications network and the remote control. The system is equipped with the necessary mechanisms so that by means of this communications network, any automatic opening device can be controlled, by being able to engage, by means of the remote control, and thanks to the connections between the communications network and the mobile device, and between the mobile device and the remote control. The remote control acts as if it were the remote control of the automatic opening device itself.

Another of the characteristic aspect of this invention is that the direction of the communication between the different components of the system is bi-directional: the remote control is equipped with integrated resources that allow it to obtain the signals that engage the automatic opening devices, and which are issued by their respective remote controls. After being processed, the signals are transferred by the remote control, to the communications network, all via the connections existing between the various' components; in other words, thanks to the connections between the remote control and the mobile device, and in turn between the mobile device and the communications network.

One method for operating the system described in this invention makes it possible to use a communications network to control and manage the accesses of any automatic opening device. A communications network can be used to engage any automatic opening device, thanks to the remote control and its connection with the mobile device. This method is characterised by the following parts:

- a user1 makes it possible to obtain, thanks to his remote control, the signal issued by the remote control that controls an automatic opening device. The remote control then processes the signal and sends it via user1's mobile device, to the communications network where the signal is processed and is made available to other users.
- a user2 wants to engage the automatic opening device and sends a request to the communications network. From this communications network, from where access is controlled and managed, the signal is sent that had previously been sent by user1, and which controls the automatic opening device, to user2's remote control, via user2's mobile device. User2's mobile device finally sends out the signal that was received from the communications network, then engaging the automatic opening device.

DESCRIPTION

Below a brief description is given of a series of sketches that will make it easier to understand the invention and which are expressly related to an embodiment of the invention as an example that does not limit it.

FIG. 1.—Shows a representation of the system as a whole:
Remote control (1)
Mobile device (2)
Communications network (3)
Automatic opening device (4)
Remote control (5) that controls the automatic opening device (4)

FIG. 2.—Shows a schematic representation of the remote control (1)
Remote control (1)
Antenna (6) that makes it possible to receive signals from the remote controls (5) that control the automatic opening devices (4)
Antenna (7) that makes it possible to send out signals that engage the automatic opening device (4)
Antenna (8) that connects with a mobile device (2)
Connection of peripheral devices (9)
Pin-type connection (10)

PREFERRED EMBODIMENT

A preferred embodiment of the invention is a system for controlling any existing automatic opening device (4), such as a garage door, and which comprises: a mobile device (2), such as any mobile phone with a connection to a telecommunications network (3) such as the internet and a remote control (1), which is the main subject of our invention.

The remote control (1) is equipped with the usual elements of remote controls, such as microprocessors, controllers, memories, a power supply system, electronic components, a printed circuit board, a case, allowing for the normal use of remotely engaging an automatic opening device (4).

Furthermore, it also includes an antenna (6) that makes it possible to engage the automatic opening devices. This way, nearby radio-frequency signals can be cloned directly and wirelessly. This is a small-sized multi-frequency RF receiver type antenna. By operating near the remote control (1), any remote control (5), the multi-frequency RF receiver will receive and then process the radio-frequency signals, that are sent by the remote control (5).

The remote control (1) includes other resources for receiving the signals that engage the automatic opening devices (4), such as via a USB-type peripheral device connection (9). In this case, the signals are received, for example, by connecting the remote control (1) with a computer, with the signals being transferred in the form of data, and which makes it possible to reproduce the same signal. This connection, also supplies electric power to the power source, with the ability to recharge the battery of the remote control (1). Moreover, by using this connection and connecting to a computer, it is possible to update the drivers of the remote control's microprocessor (1), or to transfer data to be stored in the remote control's memory (1).

Another resource integrated in the remote control (1) for receiving the signals that engage the automatic opening devices, is via a pin connection (10). This connection allows for connecting the connections of remote control duplicators.

The remote control (1) is equipped with an antenna (7) that makes it possible to send out the signals that engage the small multi-frequency RF transmitter module type automatic opening devices (4). Once it has the corresponding radio frequency, this antenna allows the remote control (1), to control the automatic opening devices (4) as if it was their own remote control (5), sending out the corresponding signal, which engages each automatic opening device (4). It should be noted that, in practise, the multi-frequency RF transmitter can also act as a receiver, which is why it not only performs the function of transmitting signals, but also, the function of receiving the signals that engage the automatic opening devices, thus making unnecessary the antenna (6) that makes it possible to receive the signals, by physically integrating this functionality.

The remote control (1) contains an antenna (8) that makes it possible to connect to any mobile device (2), such as a mobile phone, via Bluethooth®, Wifi®, Wifi Direct® technology. It is a Bluetooth® JY-MCU H-05 module antenna (8). It bears emphasising that in practise, it may be possible to install in the remote control (1), a single multi-frequency RF transmitter/receiver antenna that integrates the functionalities of receiving the signals that engage the automatic opening devices, transmitting these signals, and connecting to any mobile device (2).

The preferred embodiment of the invention is a system where the remote control (1) that we just described, thus makes it possible to wirelessly control an automatic opening device (4), such as a garage door, sending out codified radio-frequency signals, just as would be sent out by the garage door's own remote control (5). But in addition to this, the remote control (1), is characterised in that it connects to the mobile device (2), such as our mobile phone. The connection between the remote control (1) and the mobile device (2) is made by means of the functionality mentioned above, which makes it possible for mobile devices to communicate in short- and medium-range with other devices. This communication is achieved via Bluethooth®, Wifi®, Wifi Direct® technology, using what is known as device matching, with our system being able to be adapted to future wireless communications protocols.

The mobile device (2) also connects to the communications network (3), using the functionality that allows mobile devices to communicate in short- and medium-range with other devices and equipment via these networks. This communication is currently achieved by using 3G, 4G, or Wifi® technology, with our system being able to be adapted to future new technologies. This connection allows the communications network (3) to be, in turn, connected to the remote control (1).

The system has the necessary mechanisms, such as specifically developed software, that makes interaction possible between the communications network, (3), the mobile device (2) and the remote control (1). This makes it possible to transmit data, such as the signals that engage the automatic opening devices (4). In the case of the mobile device (2), part of this software is installed in the form of an application.

The communications network (3) can then be used to control any automatic opening device (4), i.e., any garage door, thanks to the remote control (1) and its connection to the mobile device (2), which in turn is connected to the telecommunications network (3). The communications network (3) is used to send the radio frequency in data format to the remote control (1), which transmits the said signal, making it possible to engage the automatic opening device (4), i.e., to open the garage door.

In order to be able to send the signal, the communications network (3) first needs to obtain the signal. To do this the remote control (1), thanks to its functionality described above, obtains, the necessary signals, by using its possible reception resources: either by cloning the signal transmitted by the remote control (5) of the automatic opening device (4), i.e., of the garage door, by connecting the remote control (1) to the computer via USB, or with a duplicator. These signals will be sent to the communications network (3) via the mobile device (2), thanks to the software installed by the system for it to function.

This way, the communications network (3), can be used to control any automatic opening device (4), due the signal that engages it having first been obtained, thanks to the remote control (1). By being able to send this signal, control occurs from the communications network (3), to any other remote control (1) that will then send the said signal, engaging the automatic opening device (4) in question: i.e., opening the garage door. In other words, any remote control (1) can be used to engage any automatic opening device (4), i.e., any garage door, that has first received the signal controlling it, with control and management coming from the communications network (3).

One method of operating the preferred embodiment of the invention, makes it possible to use a communications network to control and manage the accesses of any automatic opening device (4). The communications network (3) can be used to engage any automatic opening device (4), such as any garage door, and therefore control and manage access, all using the remote control (1) and its connection to the mobile device (2), connecting to the communications network (3). This method is characterised by the following parts:

A user1 who owns a garage uses its remote control (1) to clone the radio-frequency signal transmitted by the remote control (5) of his automatic opening device (4), i.e., his garage door. To do this, he engages his remote control (5) near the remote control (1) that receives the signal. The remote control (1) processes the signal and sends it via user1's mobile device (2), to the communications network (3) where the signal is stored and made available to other users. From this point, the accesses to the garage can be controlled and managed.

A user2, who does not own the garage, and who does not have the remote control (5), would like to access it. To do so, he uses an application on his mobile phone (2) to request the opening of the automatic opening device (4), i.e., the garage door. The communications network (3) sends the signal it had earlier received from user1, and which controls that automatic opening device (4), via user2's mobile device (2), to user2's remote control. User2's remote control (1) transmits the sent signal, then engaging the automatic opening device (4) and allowing specific access to user2. From the communications network (3), the information is known regarding the said access, such as its time and the user, and user2's request may even be denied, not opening the automatic opening device (4), i.e., the garage door, and thus preventing user2 from entering.

The invention claimed is:

1. A system for controlling an automatic opening device (4), wherein a first remote control includes an RF receiver, operating near the automatic opening device and a second remote control which is adapted to copy a radio-frequency signal sends signals from the second remote control to the automatic opening device, the first remote control being connectable to a mobile device through a communications network such that the first remote control is configured to send the copied radio-frequency signal to the automatic opening device in response to a received signal from the mobile device.

2. The system according to claim 1 wherein the first remote control includes a first antenna adapted to receive and process the signals that are sent by the second remote control of the automatic opening devices, to make it possible to engage them; and second antenna that connects to a mobile device, making it possible to receive and transmit information such as the signal received by the antenna (6) that makes it possible to receive and process the signals that, sent by the second remote control to the automatic opening devices and an antenna adapted to connect to the mobile device for receiving and transmitting information received by the antenna.

3. A system according to claim 2 wherein the first remote control comprises a third antenna configured to transmit the signals that engage the automatic opening device based on information received from the antenna (8) that connects to the mobile device (2).

4. A system according to claim 3 wherein the remote control comprises a standard connector for connecting to peripherals, that provides electric power to the remote control's power supply, that makes it possible to update the drivers of the remote control, that makes it possible to transmit information to the memories of the remote control.

5. A system according to claim 3 wherein the remote control comprises a pin-type connection for connecting the connectors of remote control duplicators.

6. A system according to claim 3 wherein the remote control includes an antenna configured to send the signals that engage the automatic opening device (4) and the antenna.

7. A system according to claim 2 wherein the first remote control comprises a standard connector for connecting to peripherals, that provides electric power to the remote control's power supply, that makes it possible to update the drivers of the first remote control, that makes it possible to transmit information to the memories of the first remote control.

8. A system according to claim 2 wherein the remote control includes a third antenna configured to send the signals that engage the automatic opening device (4) and the first antenna.

9. A remote control as in system according to claim 1, that wherein the first remote control comprises a pin-type connection for connecting with connectors of remote control duplicators.

10. A method of controlling an automatic opening device wherein a signal sent from a mobile device is received by a first remote control including an RF receiver, operating near the automatic opening device in communication with a second remote control adapted to control the automatic opening device wherein said first remote control is adapted to copy a radio-frequency signal sends signals from a second remote control and send them to the automatic opening device, the first remote control being connectable to a mobile device through a communications network such that the first remote control is configured to send the copied radio-frequency signal obtained from the second remote control to the automatic opening device in response to a received signal from the mobile device.

* * * * *